(12) United States Patent
Alicandro et al.

(10) Patent No.: US 6,606,115 B1
(45) Date of Patent: Aug. 12, 2003

(54) METHOD AND APPARATUS FOR MONITORING THE THERMAL CHARACTERISTICS OF AN IMAGE

(75) Inventors: Christopher J. Alicandro, Marlboro, MA (US); Bruce A. Poirier, Salem, NH (US)

(73) Assignee: Flir Systems Boston, Billerica, MA (US)

( * ) Notice: Subject to any disclaimer, the term of this patent is extended or adjusted under 35 U.S.C. 154(b) by 0 days.

(21) Appl. No.: 09/062,538

(22) Filed: Apr. 18, 1998

(51) Int. Cl.[7] ................................. H04N 5/33
(52) U.S. Cl. ................. 348/164; 348/169; 250/330; 250/358; 250/342; 250/349; 250/332
(58) Field of Search ................. 348/164, 169; 250/230, 349, 342, 352, 358, 332

(56) References Cited

U.S. PATENT DOCUMENTS

| | | | | |
|---|---|---|---|---|
| 3,889,053 A | * | 6/1975 | Lloyd et al. | 178/6 |
| 4,520,504 A | | 5/1985 | Walker et al. | 382/1 |
| 5,219,226 A | * | 6/1993 | James | 374/124 |
| 5,250,809 A | * | 10/1993 | Nakata et al. | 250/330 |
| 5,404,013 A | * | 4/1995 | Tajima | 250/332 |
| 5,637,871 A | * | 6/1997 | Piety et al. | 250/330 |
| 5,811,808 A | * | 9/1998 | Cannata et al. | 250/332 |

* cited by examiner

Primary Examiner—Chris Kelley
Assistant Examiner—Shawn S. An
(74) Attorney, Agent, or Firm—Edward L. Kelley; John A. Merecki

(57) ABSTRACT

A method and apparatus for automatically identifying and tracking the hottest spot in an infrared scene captured and displayed by an infrared camera system. In an Autospot Mode of the present invention, a cursor is automatically positioned on the display device over the hottest spot in the infrared scene image captured by the camera. The temperature at this location is also automatically displayed. The location of the cursor, and the temperature of the scene at this location, are automatically updated for successive frames of data captured and displayed by the infrared camera system. In a Delta Mode of the present invention, the difference in temperature between two points in a thermal image, designated by an operator using first and second cursors, is calculated and displayed.

10 Claims, 9 Drawing Sheets

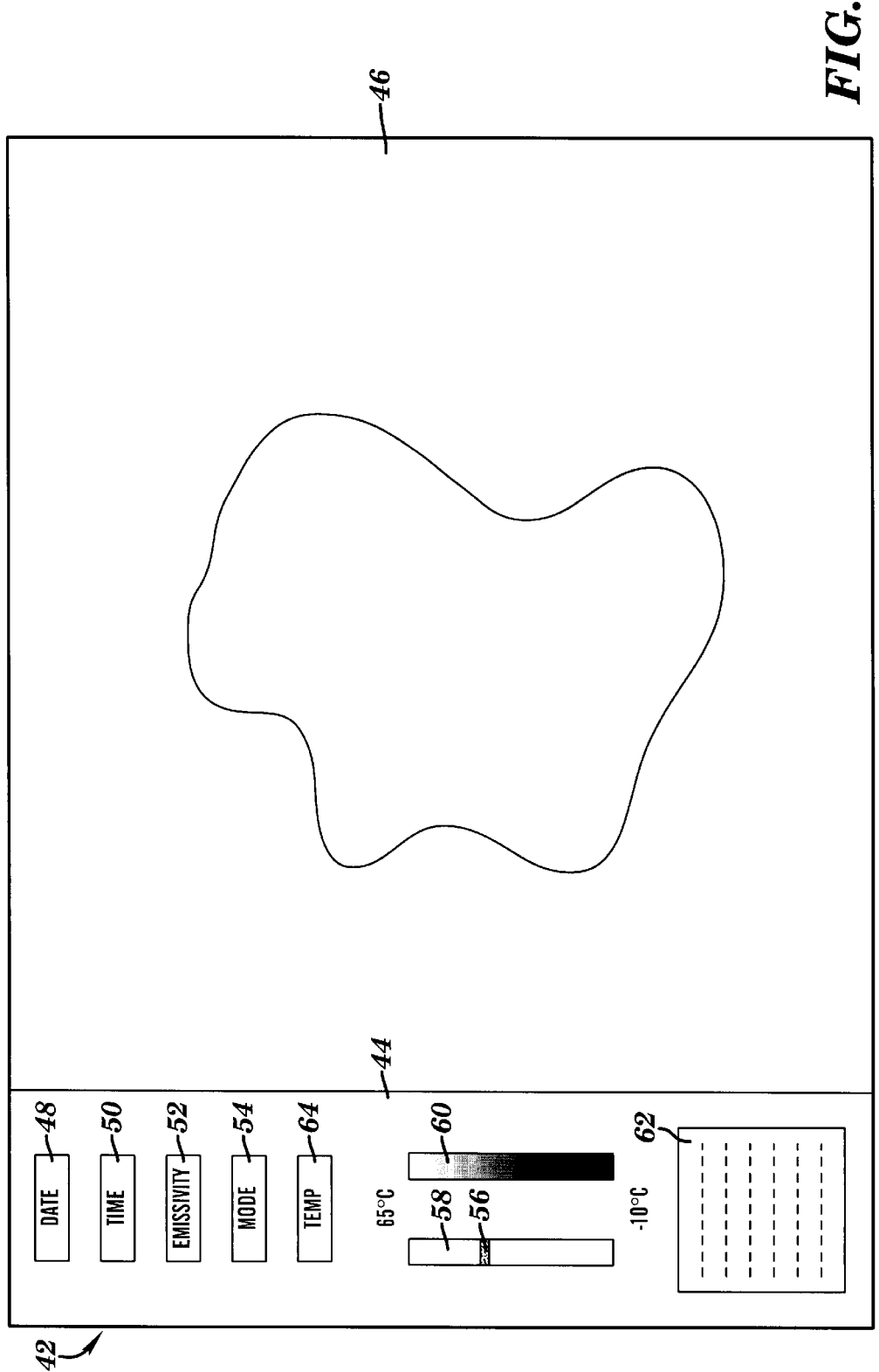

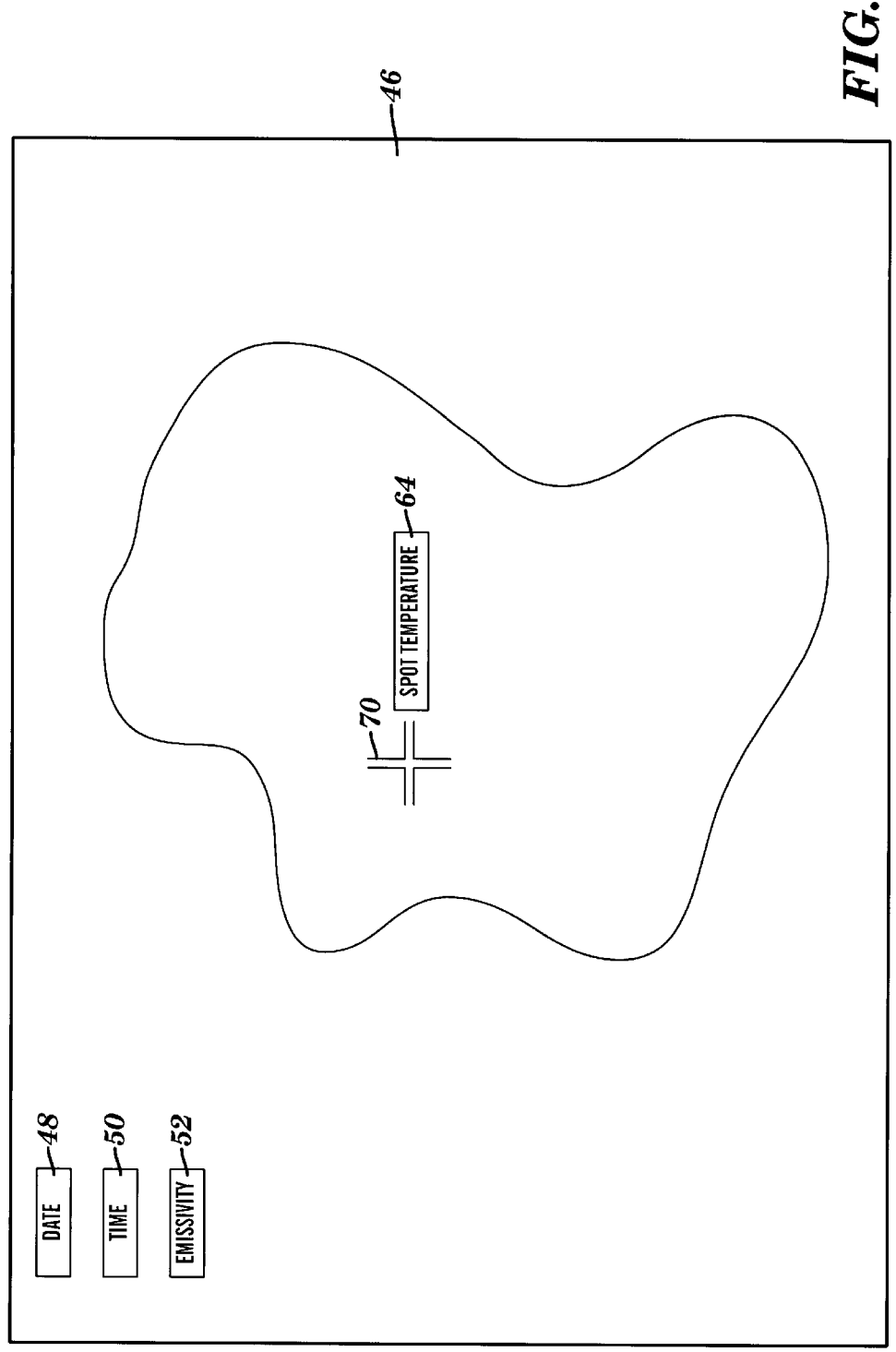

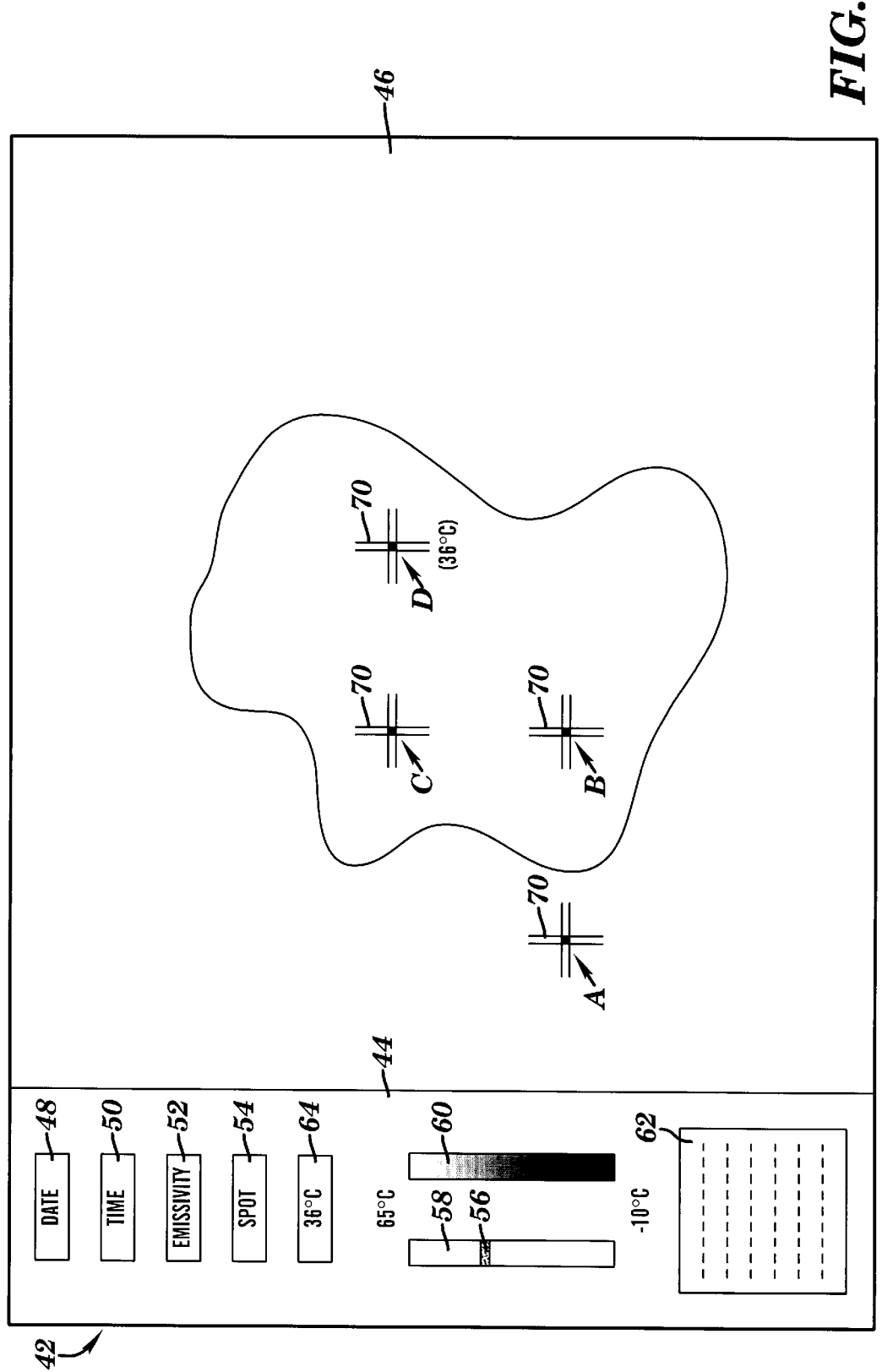

METHOD AND APPARATUS FOR MONITORING THE THERMAL CHARACTERISTICS OF AN IMAGE

FIELD OF THE INVENTION

The present invention relates in general to infrared camera systems. In particular, the present invention provides a method and apparatus for monitoring the thermal characteristics of a scene captured using an infrared camera system.

BACKGROUND OF THE INVENTION

Infrared camera systems are commonly used for the inspection and monitoring of the temperature profile exhibited by an object or scene (hereinafter collectively referred to as a "scene"). For example, characteristics such as the thermal conductivity and insulative performance of electrical components, mechanical devices, physical structures, and the like, are frequently analyzed using an infrared camera system.

Often, one of the primary goals of the inspection/monitoring process is to locate and determine the temperature of the hottest spot in the scene or to compare the hottest spot in the scene to earlier images of the same scene. It is known to display the temperature of a selected spot of the scene in a temperature display window. This allows an operator to manually search the scene for the maximum temperature of the scene. Presently this is performed by manually manipulating a software generated cursor or other graphic element displayed superimposed over a displayed image of the scene. The cursor is manually manipulated via a keyboard, mouse, or other input device. The temperature of the spot associated with the cursor position is actively displaying in a temperature display window. Thus the hottest spot in the scene can be subjectively determined by a manual search. This is a relatively simple, albeit tedious process, as long as the temperature profile of the scene remains stable, and the scene exhibits a sufficiently large range of temperatures. However, it is still a subjective process and, as such, even under the best of conditions, an operator may fail to accurately locate and determine the temperature of the hottest spot within the scene. This is especially true if the location or temperature of the hottest spot is constantly shifting within the scene.

SUMMARY OF THE INVENTION

The present invention obviates these and other disadvantages of the prior art by providing a method and apparatus for automatically identifying and tracking the hottest spot in a scene captured and displayed by an infrared camera system. In a first aspect of the present invention, a cursor, preferably in the form of cross hairs, or similar type of visual indicator, is superimposed onto a video display displaying a video image of the scene in the location corresponding to the hottest spot in the infrared scene. The temperature at this location is also automatically displayed. The location of the cursor, and the temperature of the scene at this location, are automatically updated for successive frames of data captured and displayed by the infrared camera system. Alternatively, once the hottest spot has been determined, the location of the cursor and the temperature displayed may also be locked to perform further analysis.

In a second aspect of the present invention, first and second cursors are provided to allow an operator to determine and view the temperature difference between first and second points in the infrared scene. For example, the first cursor may be configured to correspond to the hottest spot in the infrared scene as described above while the second cursor may be manually positioned by an operator on another point in the infrared scene. The temperature difference between the two point is displayed and continuously updated as either or both of these temperatures fluctuate. In another embodiment, the position of the first cursor and the temperature of the first spot associated with the first cursor may by locked while the second cursor is manually positioned by an operator on other points in the infrared scene to determine the temperature difference between points associated with the first and second cursors.

Generally, the present invention is directed toward a technique for monitoring the thermal characteristics of a scene captured using an infrared camera system, comprising the steps of:

capturing thermal data;

automatically detecting a particular spot in the thermal data, which may be the hottest or the coldest spot;

displaying the thermal data on a display device;

automatically displaying and positioning a visual indicator on the display device over the particular spot; and repeating the above steps to automatically track the particular spot in the thermal data.

In another embodiment of the present invention a method for determining a difference in temperature between two spots of a thermal scene comprises the steps of:

capturing thermal data;

automatically detecting a the hottest or the coldest spot in the thermal data;

displaying the thermal data on a display device;

automatically displaying a first visual indicator on the display device over the hottest or coldest spot detected;

displaying a second visual indicator on the display device;

positioning the second visual indicator over a second spot in the thermal data; and, displaying a temperature difference between the hottest or coldest spot and the second spot.

It should be readily apparent that the present invention is not limited to the automatic detection and tracking of the hottest spot in a thermal scene. Indeed, the present invention may be used to detect and track the coolest point in a thermal scene, or any other desired reference temperature, without departing from the intended scope of present invention as defined in the accompanying claims.

BRIEF DESCRIPTION OF THE DRAWINGS

The features of the present invention will best be understood from a detailed description of the invention and a preferred embodiment thereof selected for the purposes of illustration and shown in the accompanying drawing in which:

FIG. 3 is an enlarged view of the display device of the infrared camera system of FIG. 1, illustrating the type of data which may be displayed thereon in accordance with the present invention;

FIG. 4 illustrates an alternate display mode of the present invention;

FIG. 6 illustrates the Spot Mode of the present invention;

DETAILED DESCRIPTION OF THE INVENTION

Figure 1:
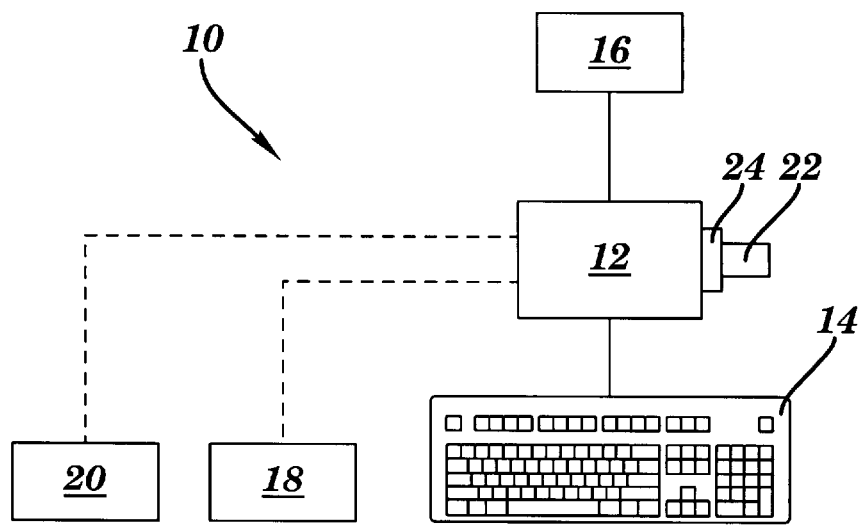
FIG. 1 illustrates an infrared camera system in accordance with a preferred embodiment of the present invention.

Referring now specifically to FIG. 1, there is illustrated an infrared camera system 10 in accordance with a preferred embodiment of the present invention. The infrared camera system 10 generally includes an infrared camera 12 for capturing a thermal image of a scene, a keyboard 14 for operating the infrared camera, and a color or grayscale video display device 16, e.g. a cathode ray tube CRT display or liquid crystal display, LCD, or the like, for viewing thermal images in real time, and/or reviewing previously captured thermal images. A PCMCIA memory card 18, or other suitable internal or external storage device, may be provided to store the thermal images captured by the infrared camera 12 for later analysis. Thermal images stored on the memory card 18 may be later recalled by a camera operator and viewed on the display device 16. The PCMCIA memory card 18 may also be removed from the infrared camera system and installed in a PCMCIA memory slot of a workstation, e.g. a personal computer or the like, to allow viewing of thermal images stored on the memory card 18 by a workstation operator. The thermal images provided by the infrared camera 12 may additionally be viewed on an external display device 20 connected with the infrared camera 10.

An imaging lens unit 22, for imaging at least a portion of an object scene onto the infrared sensor assembly of the infrared camera 12, is detachably mounted onto the body of the camera. Preferably, a plurality of different imaging lens units 22 may be interchangeably mounted onto the body of the infrared camera 12, depending upon the object scene to be captured, environmental conditions, and other factors. Each imaging lens unit 22 is provided with a memory device (not shown) for storing identifying information corresponding to that imaging lens unit 22.

An optical filter unit 24 may also be detachably mounted intermediate to the imaging lens unit 22 and the body of the infrared camera 12. As with the imaging lens unit 22, a plurality of different optical filter units 24 may be interchangeably attached to the infrared camera 12. Each optical filter unit 24 is also provided with a memory device (not shown) containing identifying information corresponding to that optical filter unit 26.

Figure 2:
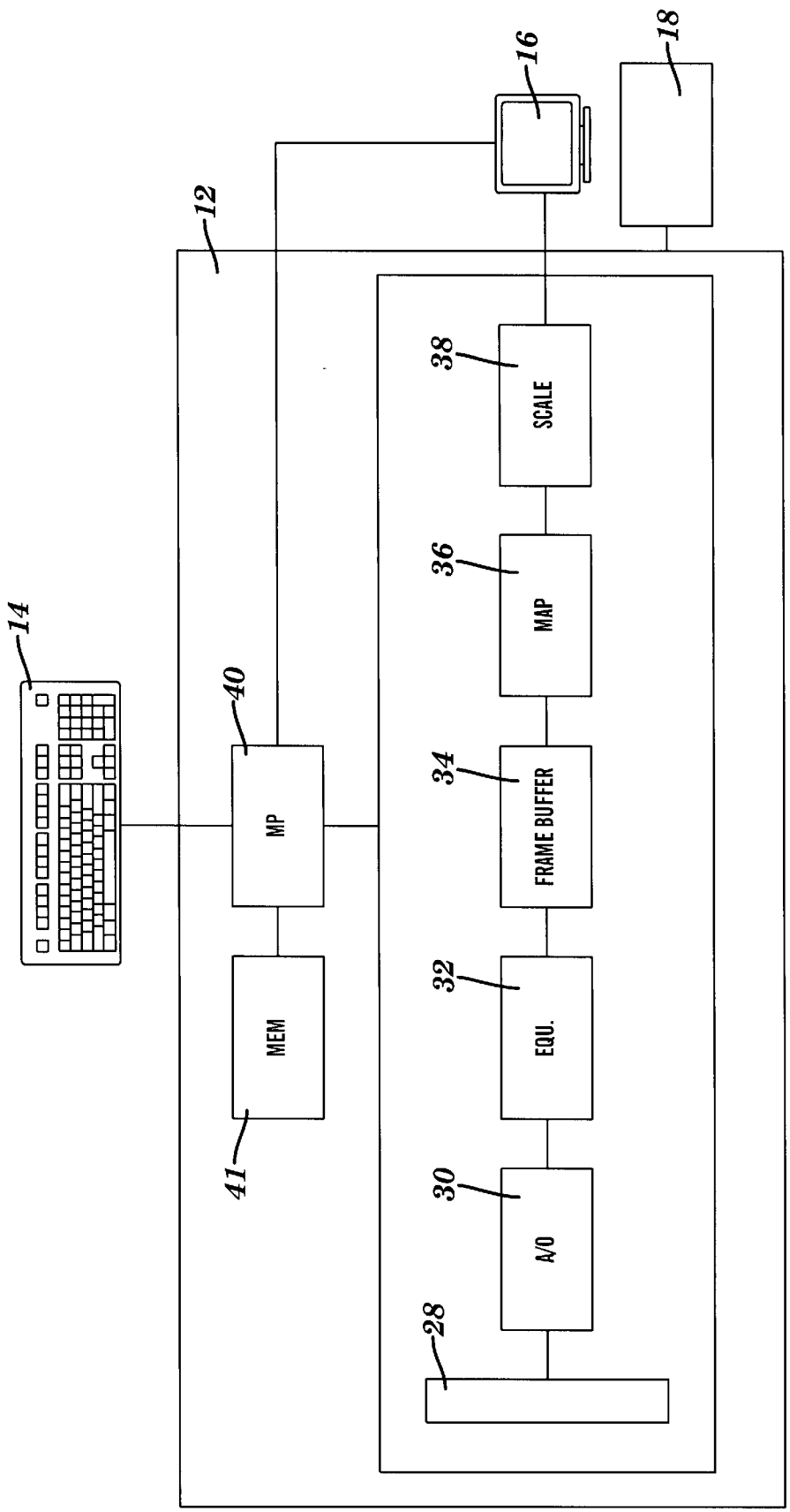
FIG. 2 is a block diagram illustrating the components of the infrared camera used in the infrared camera system of FIG. 1.

The components of the infrared camera 12 of the present invention are illustrated in detail in FIG. 2. The infrared camera 12 includes an infrared sensor assembly 28, such as a cooled or uncooled focal plane array, e.g. a CCD or pyroelectric array, or the like, for detecting thermal radiation emitted by a scene under analysis. Of course, other types of infrared sensors or scanners may also be used to detect the thermal profile of a scene without departing from the intended scope of the present invention. The analog output of the infrared sensor assembly 28 is converted into digital image data by an analog to digital (A/D) converter 30. Thereafter, the digital image data produced by the A/D converter is directed into an equalization processor 32, which applies a pixel to pixel correction to the digital image data in a manner known in the art. The corrected digital image data is subsequently stored in a frame buffer 34. This same corrected digital image data may also be stored on the memory card 18. The digital image data is output from the frame buffer 34, mapped by a mapper 36 and scaled by a scaler 38, as necessary for displaying the corrected digital image of the scene, again in a manner known in the art, onto display device 16 of the infrared camera system 10. In addition, the corrected digital thermal image data and other information (see below) displayed on the display device 16 may be stored in the PCMCIA memory card 18 or in another storage device associated with the infrared camera 12 for later analysis or archival purposes. A microprocessor 40 controls the operation of the infrared camera 12 and the display device 16 in response to programmed instructions stored in a memory 41, and operator commands input via the keyboard 14.

The display device 16 is used by an operator to view live thermal images of a scene in real time, or to view thermal images previously stored, for example, in the PCMCIA memory card 18. The display on the display device 16 (or external display device 20) provides an operator of the infrared camera system 10 with a wealth of information for making accurate and reliable temperature measurements in the field, laboratory, or other location. As illustrated in detail in FIG. 3, the display 42 on the display device 16 generally includes an image display area 46 and may include an information panel 44.

The image display area 46 is provided for the display of the thermal image captured by the infrared camera 12. Generally, the thermal image is displayed in the image display area 46 using a number of colors or levels of gray, wherein each color or level of gray corresponds to a temperature or range of temperatures detected by the infrared camera 12.

The information panel 44 provides a summary of camera and image settings, status, and conditions. The date 48 and time 50 are continuously displayed at the top of the information panel 44. Additional information, such as the emmissivity 52 of the scene, and the operating mode 54 of the infrared camera system 10, are also displayed. An operator controlled span marker 56, located in a temperature range bar 58, identifies the range of temperatures currently being displayed in the image display area 46. The colors or gray levels corresponding to the temperatures within the temperature range bar 58 are identified in an adjacent span/color bar 60.

A scrolling status window 62 displays a listing of camera setup and status information. The camera setup and status information displayed in the scrolling status window 60 may include, for example, data regarding the background temperature, the atmospheric temperature, the status of the camera battery, the relative humidity, the target distance, the presence of a PCMCIA memory card 18, the output data format (e.g., 8 or 12 bit TIFF), the elapsed time, and the presence and identity of an imaging lens unit 22 and an optical filter unit 24.

The information panel 44 additionally includes a temperature readout 62 for displaying a temperature value (e.g., in degrees Celsius or Fahrenheit) derived by the microprocessor 40 from the digital image data stored in the frame buffer 34. The temperature value may be derived using both manual and automatic operating modes as described below. An operator can switch between the different operating modes using the keyboard 14. The current operating mode 54 is displayed in the information panel 44.

Alternatively, the image display area 46 may fill the display device 16 such that the video image is displayed from edge to edge as is shown in FIG. 4. In this case, information as detailed above may be displayed so as to be superimposed over the video image being displayed. Moreover, the types of information being, displayed may be selectable by an operator, using the keyboard 14, such that information not relevant to the particular measurement may be eliminated from the display area 46. As shown in FIG. 4, the date 48, time 50 and emmissivity 52 are displayed in a corner of the display area 46. Other information included in the information panel 44 detailed above has been suppressed from the display area 46.

In the present invention, a software generated cursor is used to designate a location on the thermal image displayed in the image display area 46. Other types of visual indicators may also be used. As detailed below, a cursor may be automatically positioned over a location having a specific temperature (e.g., the hottest spot), or may be manually positioned at a location where the temperature is to be determined.

Figure 5A:
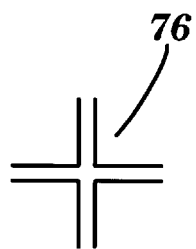
FIGS. 5A, 5B, and 5C illustrate several examples of cross hairs which may be displayed on the display device to identify the hottest spot or other temperature in the displayed frame of thermal data.
Figure 5B:
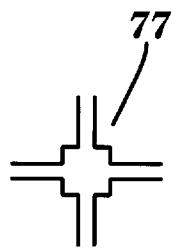
Figure 5C:
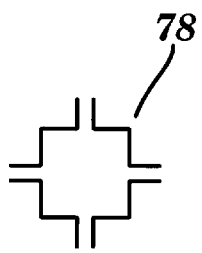

Examples of cursors 70 suitable for use in the present invention, each shaped in the form of cross hairs and having a different resolution, are illustrated in FIGS. 5A, 5B, and 5C. In the present invention, the resolution of the cursor 70 is defined by the size of the spot 72 (in pixels) at the intersection of the legs 74 of the cross hairs. In FIG. 5A, for example, the cross hairs 76 have a 1×1 resolution. Lower resolution 3×3 and 5×5 cross hairs 77, 78 are illustrated in FIGS. 5B and 5C, respectively. A temperature value is determined for a cursor 70 based on an average of the temperature values for the pixels located within the spot 72 of the cursor 70.

A first mode for determining the temperature of a location of the thermal image displayed on the image display area 46 is illustrated in FIG. 6. This mode is defined as a Spot Mode because it is designed to allow an operator of the infrared camera system 10 to read the temperature at a specific location on the displayed thermal image.

In the Spot Mode, an operator manually positions a cursor 70 (e.g., 1×1 cross hairs 76) over a location on the displayed thermal image using predetermined cursor keys on the keyboard 14. For example, the keyboard 14 may include a left arrow key (←), right arrow key (→), up arrow key (↑), and down arrow key (↓) which are configured to displace the cursor 70 in a left, right, upward, and downward direction, respectively, on the displayed thermal image. Alternately, a mouse or other suitable input device may be used to displace the cursor 70 to any desired position on the displayed thermal image. As the cursor 70 is displaced over the displayed thermal image, the temperature value corresponding to the location of the cursor 70 on the image is constantly updated and displayed in the temperature readout 62. The temperature value is derived in a conventional manner by the microprocessor 40 from the digital image data stored in the frame buffer 34. In FIG. 6, the cursor 70 is displaced using the arrow keys (not shown) on the keyboard 14 from point A to point D through intermediate points B and C. In this example, the temperature at point D has been determined to be 36° C. This temperature value is displayed in the temperature readout 62 of the information panel 44. Referring back to FIG. 4, the temperature readout 62 may also be displayed adjacent the cursor 70.

The infrared camera system 10 may also be operated in an Autospot Mode, wherein the hottest spot in the thermal image is automatically detected, and a cursor 70 or other visual indicator is automatically positioned over the hottest spot in the thermal image displayed in the image display area 46. The location of the cursor 70 is automatically updated for successive frames of the thermal data to automatically track the hottest spot in the displayed thermal image. The temperature value corresponding to the hottest spot in the displayed thermal image is also automatically updated and displayed in the temperature readout 62.

Figure 7:
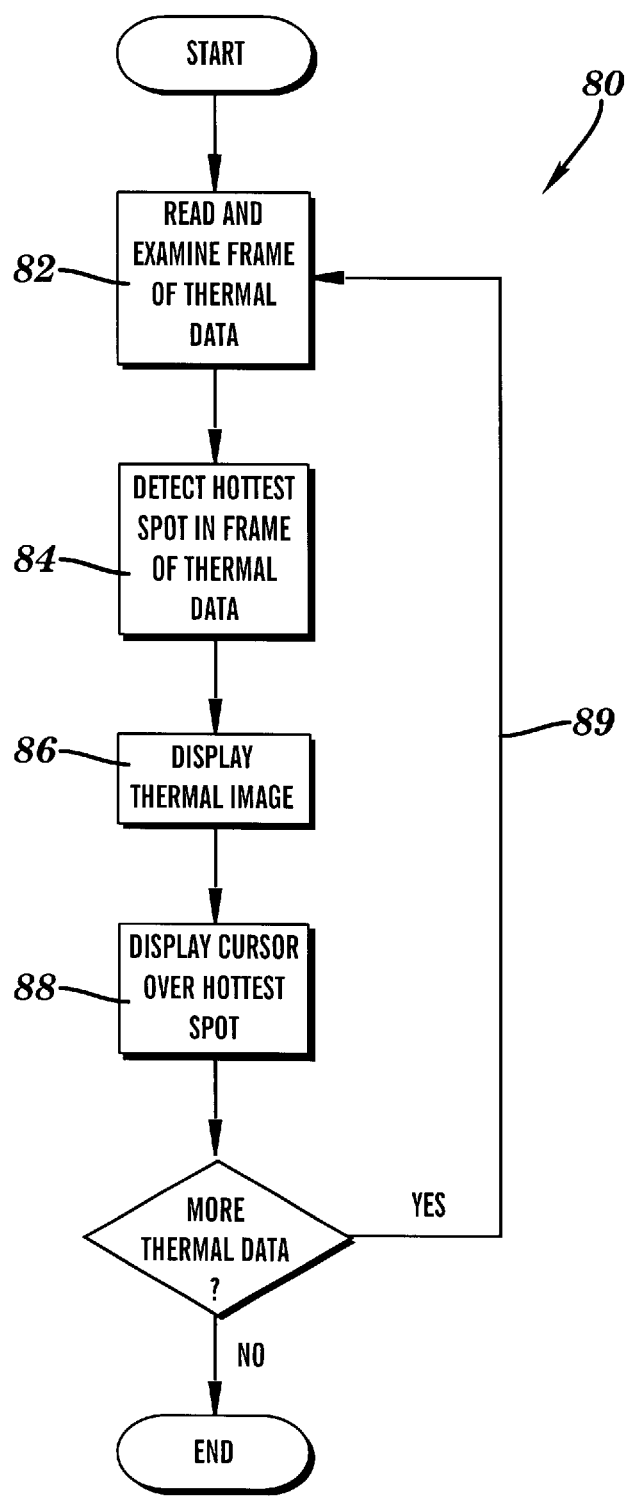
FIG. 7 is a flowchart illustrating the Autospot Mode of the present invention.

A flowchart 80 describing the Autospot Mode of the present invention is illustrated in FIG. 7. In block 82, the microprocessor reads and examines the frame of thermal data currently stored in the frame buffer 34. In block 84, the microprocessor determines which portion of the thermal data is associated with the hottest spot in the scene captured by the infrared camera. The frame of thermal data stored in the frame buffer 34 is subsequently displayed 86 in the image display area 46, and a cursor 70 is generated and automatically positioned 88 over the hottest spot. This process is repeated 89 for successive frames of thermal data stored in the frame buffer 34 while the infrared camera system 10 is operating in the Autospot Mode.

Figure 8:
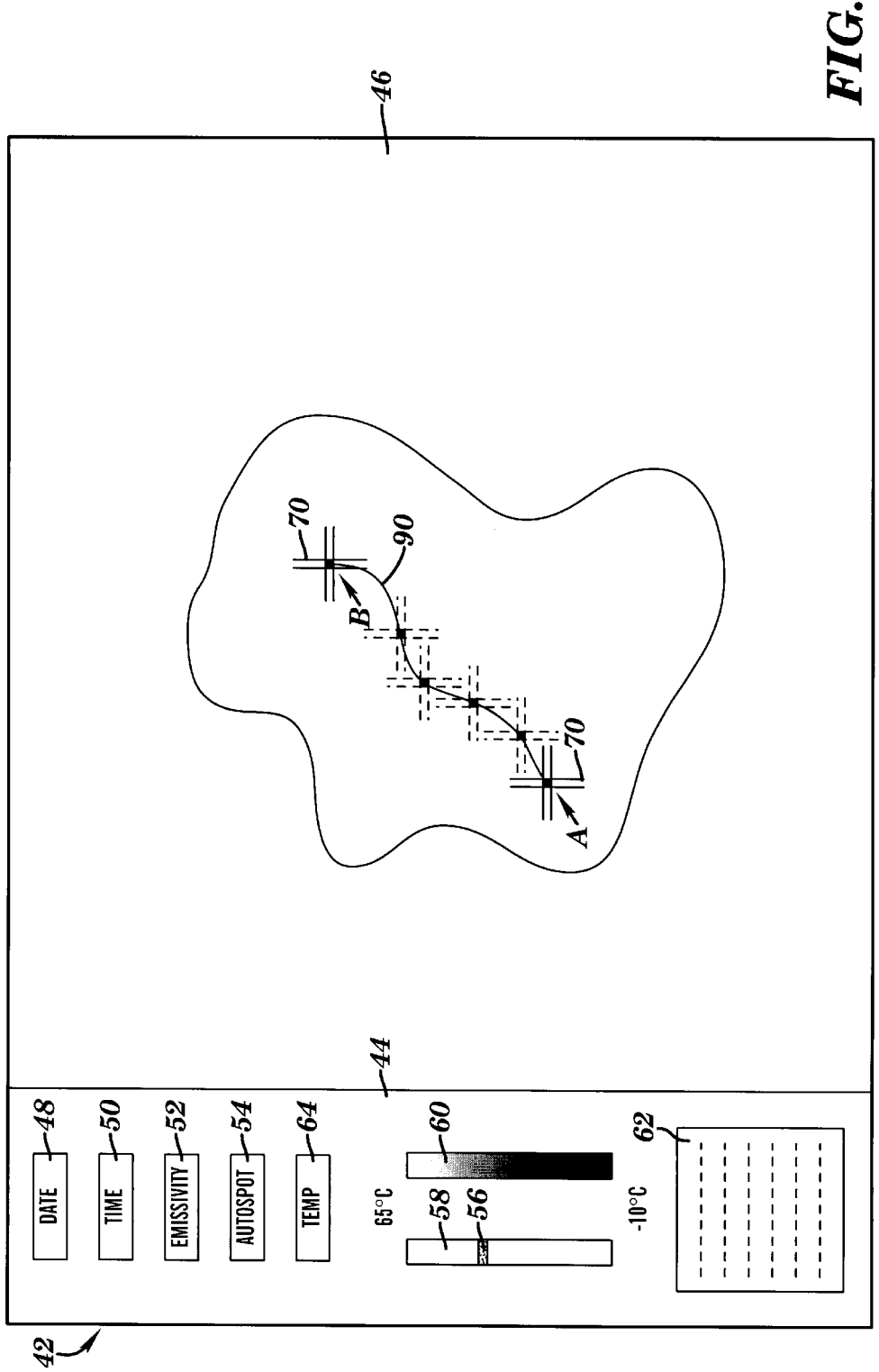
FIG. 8 illustrates the Autospot Mode of the present invention.

A visual example of the Autospot Mode is illustrated in FIG. 8. In this example, the hottest spot in the displayed thermal image is initially located at point A. A cursor 70 is automatically displayed over point A to identify the location of the hottest spot. The hottest spot in the displayed thermal image subsequently travels toward point B in the displayed thermal image along path 90. As the position of the hottest spot changes along path 90 from frame to frame, the cursor 70 is automatically repositioned over the hottest spot as illustrated in phantom, and the temperature value corresponding to the hottest spot is updated and displayed in the temperature readout 62. In this manner, the hottest spot in the displayed thermal image may be easily tracked by an operator.

Figure 9:
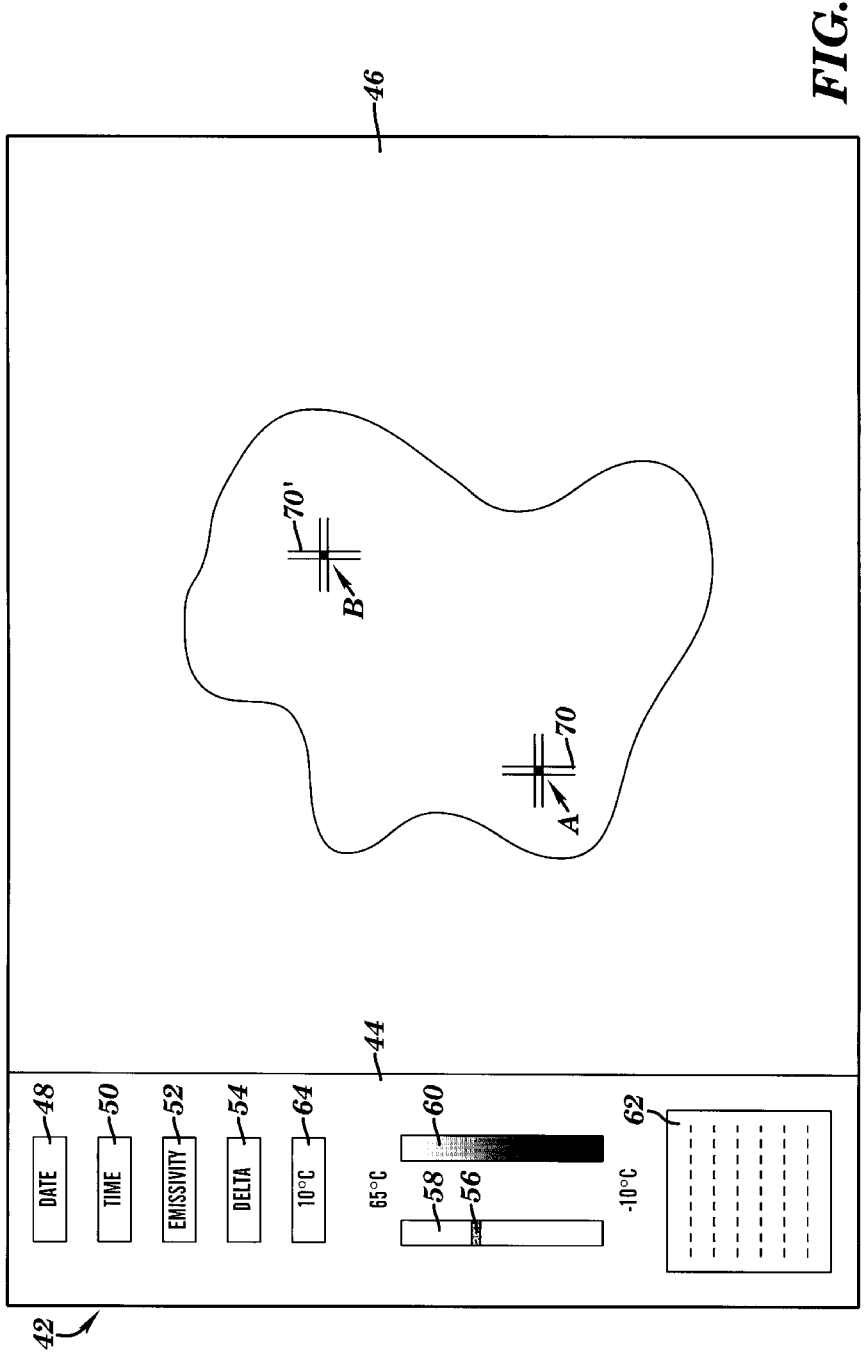
FIG. 9 illustrates the Delta Mode of the present invention.

Yet another operating mode of the present invention, the Delta Mode, is illustrated in FIG. 9. The Delta Mode allows an operator to measure and read the temperature difference between any two points in the thermal image displayed in the image display area 46. The difference in temperature is displayed in the temperature readout 62. Preferably, the Delta Mode is used to determine and monitor the temperature difference between a selected reference point and another point in the thermal image. The selected reference point may correspond to a location in the displayed thermal image corresponding to "room temperature," the hottest or coldest point (e.g., as determined using the Spot Mode or Autospot Mode of the present invention), or other desired temperature value.

Referring specifically to FIG. 9, a reference point A, having a temperature of 20° C., is selected by an operator using the arrow keys on the keyboard 14, and a cursor 70 is positioned over the selected reference point A. The temperature of the selected reference point A is displayed in the temperature readout 62. Once suitably positioned, the reference point cursor 70 is fixed over the selected reference point A in response to the selection of the Delta Mode using the keyboard 14. After the Delta Mode is selected, a second cursor 70' automatically appears in the image display area 46. The cursor keys on the keyboard 14 are then manipulated to displace the second cursor 70' over a second point B of interest on the displayed thermal image. The temperature difference between points A and B (10° C. in this example, assuming the temperature at point B is 30° C.) is displayed in the temperature readout 62. The temperature value at the selected reference point A may be held at its original value (Static Option), or may be allowed to change as the temperature at point A changes over time (Dynamic Option).

In one particularly advantageous mode of operating the camera system 12 according to the present invention, the Auto Spot mode is first used to automatically position a cursor, at the hottest spot in a scene. In the example of FIG. 9, the Auto Spot mode automatically positions the reference point cursor 70 over the hottest point in the scene. By then selecting the Delta Mode, using the keyboard 14, the reference cursor is fixed over the hottest spot in the scene and the second cursor 70' automatically appears in the image display area 46. The operator may now determine the temperature difference between the hottest point of the scene and any other point in the scene by manually positioning the second cursor 70'.

In another embodiment, which combines the functionality of the Auto Spot and Delta modes, a first cursor 70 is automatically repositioned over the hottest spot and continues to track the hottest spot as it changes from frame to frame while a second cursor 70' is displayed over another spot. In this case, the temperature difference between the hottest spot of the scene and spot corresponding with the cursor 70' is updated and displayed in the temperature readout 62.

Figure 10:
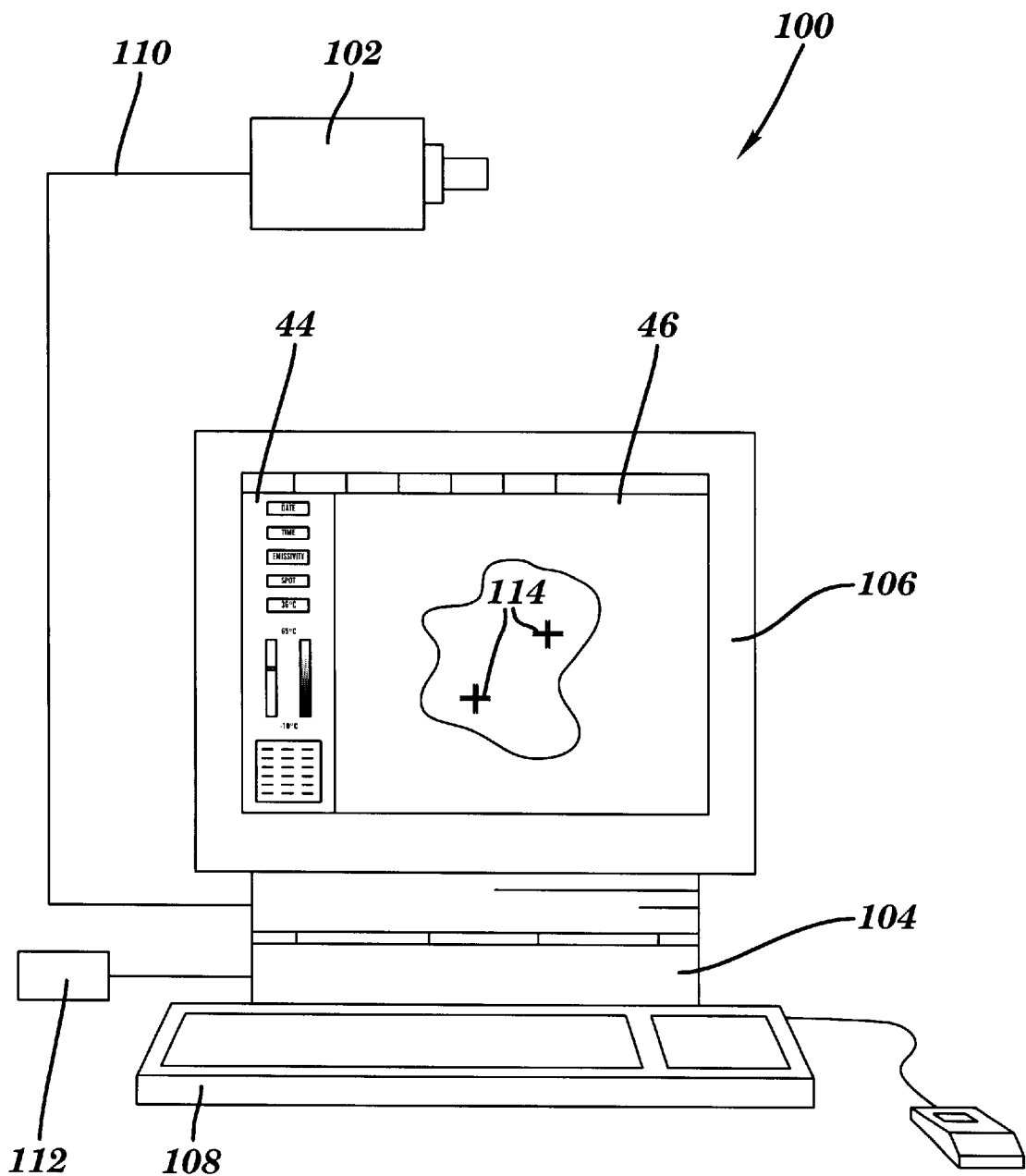
FIG. 10 illustrates an alternate embodiment of the present invention.

A further embodiment 100 of the present invention is illustrated in FIG. 10. In this embodiment, an infrared camera 102 is connected to a workstation or computer system 104, which may be a portable or lap top computer, having a display device 106 and keyboard 108. Thermal data captured by the infrared camera 102 is downloaded into the computer system 104 via an appropriate cable 110 in a manner known in the art. Alternately, thermal data may be provided to the computer system on a storage device 112 (e.g., the PCMCIA memory card 18 of the infrared camera system 10 illustrated in FIG. 1). The computer system 104 includes a software program which replicates the functionality of the camera system 10 above. Preferably, as described above with regard to the infrared camera system 10, a scene image, and information associated therewith, are displayed in an image display area 46 and information panel 44, respectively, on the display device 106. The computer system 104 is also programmed to display one or more visual indicators 114 over the thermal data displayed in the image display area 46 in accordance with the previously described Spot, Autospot, and Delta Modes. Thus in the second embodiment of the present invention, the computer system 104 may be used to view, store and analyze live images or previously captured images and in particular may be used in the Autospot and Delta modes described above.

It should also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, those skilled in the art will recognize that its usefulness is not limited thereto and that the present invention can be beneficially utilized in any number of environments and implementations. In particular, it will be recognized by those skilled in the art that the Spot, Autospot, and Delta Modes may be used to find the coldest spot in a video image or to find other spots in the image, e.g. of a particular temperature. Accordingly, the claims set forth below should be construed in view of the full breath and spirit of the invention as disclosed herein.

We claim:

1. A method for monitoring thermal characteristics of a scene captured using an infrared camera system, comprising the steps of:

capturing a frame of thermal data;

deriving a temperature value corresponding with each spot in the frame of thermal data;

automatically detecting a spot having a selected temperature characteristic with respect to other spots in the frame of thermal data;

displaying the frame of thermal data on a display device;

displaying a visual indicator on the display device positioned over the spot having the selected temperature characteristic;

automatically tracking the spot having the selected temperature characteristic over a plurality of successive frames of the thermal data by performing the above steps for each of the successive frames of the thermal data;

displaying another visual indicator on the display device positioned over another spot on the display device and wherein the position of the another visual indicator on the display device is controllable by an operator of the infrared camera system; and displaying thermal information relating to the captured thermal data over the frame of thermal data being displayed on the display device and wherein the thermal information includes a temperature difference between the spot having the selected temperature characteristic and the another spot.

2. A method for monitoring thermal characteristics of a scene captured using an infrared camera system, comprising the steps of:

capturing thermal data;

automatically detecting a the hottest spot in the thermal data;

displaying the thermal data on a display device;

automatically displaying a first visual indicator on the display device over the hottest spot detected;

displaying a second visual indicator on the display device;

positioning the second visual indicator over a second spot in the thermal data; and, displaying a temperature difference between the hottest spot and the second spot.

3. A method according to claim 2 further comprising the steps of:

automatically tracking the hottest spot in the thermal data;

automatically displaying and positioning the first visual indicator on the display device over the hottest spot; and, automatically displaying the temperature difference between the hottest spot and the second spot.

4. An infrared camera system comprising:

an infrared sensor assembly for capturing a video thermal image of a scene and for providing an analog video image signal representative of the scene;

an A/D converter for converting the analog video image signal to provide captured thermal data representative of the scene;

a frame buffer for storing a plurality of successive frames of the captured thermal data;

a display device for displaying the plurality of successive frames of captured thermal data;

a processor for deriving a temperature value corresponding with each spot in each of the successive frames of thermal data and for automatically detecting a spot having a selected temperature characteristic with respect to other spots in each of the plurality of successive frames of the thermal data;

a display device driver in communication with the processor for displaying the successive frames of thermal data and for displaying a first visual indicator over the captured thermal data and coincident with the spot having the selected temperature characteristic and for tracking the position of the spot over each of the successive frames of captured thermal data and further wherein the display device driver is in communication with a keypad and further wherein the display device displays a second visual indicator over each of the plurality of successive frames of the captured thermal data and wherein the second visual indicator is movable to a second spot in the captured video data in response to keypad inputs; and, wherein a temperature difference between the spot having the selected temperature characteristic and the second spot is displayed on the display device and the displayed temperature difference is updated by the processor for each successive frame.

5. A method for monitoring thermal characteristics of a scene captured using an infrared camera system, comprising the steps of:

storing successive frames of thermal data in a frame buffer while the infrared camera system is continuously operating;

displaying the thermal data on a display device;

selecting a first spot in the thermal data, said first spot having a first temperature;

displaying a first visual indicator on the display device over said first spot in the thermal data;

selecting a second spot in the thermal data;

displaying a second visual indicator on the display device over said second spot in the thermal data;

determining a temperature difference between the temperature of the first spot and a temperature of the second spot; and, displaying the temperature difference on the display device.

6. The method according to claim 5 further comprising the steps of:

fixing a position of the first visual indicator on the display device;

repositioning the second visual indicator to select a plurality of other spots of thermal data displayed on the display device;

determining a temperature difference between the temperature of the first spot and each of the other spots; and, displaying each temperature difference on the display device.

7. A method for monitoring thermal characteristics of a scene captured using an infrared camera comprising:

capturing a frame of thermal data;

displaying the frame of thermal data on a display device;

selecting a first spot in the thermal data and positioning a first visual indicator on the display device over the first spot;

selecting a second spot in the thermal data and positioning a second visual indicator on the display device over the second spot; and, deriving a temperature difference between the first spot and the second spot.

8. A method according to claim 7 further comprising the step of displaying the temperature difference on the display device.

9. A method according to claim 8 further comprising the step of updating the temperature difference for each successive frame of thermal data.

10. An infrared camera system comprising:

an infrared sensor assembly for capturing a video thermal image of a scene and for providing an analog video image signal representative of the scene;

an A/D converter for converting the analog video image signal to provide captured thermal data representative of the scene;

a frame buffer for storing a plurality of successive frames of the captured thermal data;

a display device for displaying the captured thermal data;

means for formatting the plurality of successive frames of the captured thermal data for display on the display device;

a processor for deriving a temperature value for each spot in each of the plurality of successive frames of the thermal data;

a display device driver in communication with the processor for displaying a first visual and a second visual indicator over the captured thermal data in each of the plurality of successive frames of the captured thermal data;

a keypad for controlling a position of the first and the second visual indicators on the display device such that each of the first and the second visual indicators is separately movable to two different selected spots in the captured video data in response to keypad inputs for obtaining the temperature value of each of the two different selected spots and wherein the processor calculates a temperature difference between the two different selected spots indicated by the first and second visual indicators; and, wherein the display device driver is configured to display the temperature difference between the two different selected spots on the display device.

* * * * *